W. Butler,

Canal-Lock Valve,

Nº 14,387.  Patented Mar. 11, 1856.

UNITED STATES PATENT OFFICE.

WM. BUTLER, OF LITTLE FALLS, NEW YORK.

VALVE FOR LOCK-GATES.

Specification of Letters Patent No. 14,387, dated March 11, 1856.

*To all whom it may concern:*

Be it known that I, WILLIAM BUTLER, of Little Falls, in the county of Herkimer and State of New York, have invented a new and useful Improvement in Valves for Lock-Gates; and I do hereby declare that the following is a full and exact description.

To enable others to make and use my invention I proceed to describe its construction and operation, reference being had to the drawings hereunto annexed and making part of this specification.

Figure 5:
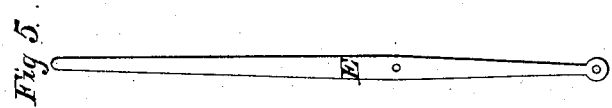
Figure 4:
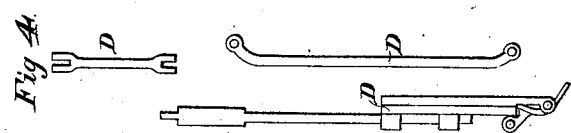
Figure 3:
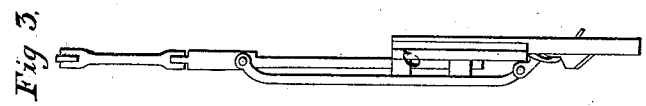
Figure 2:
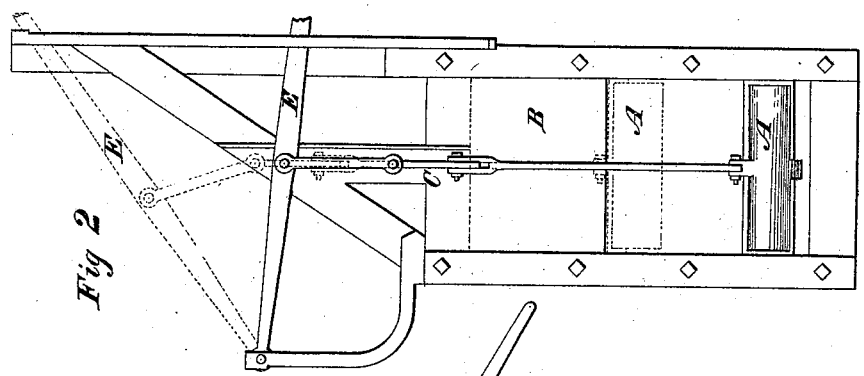
Figure 1:
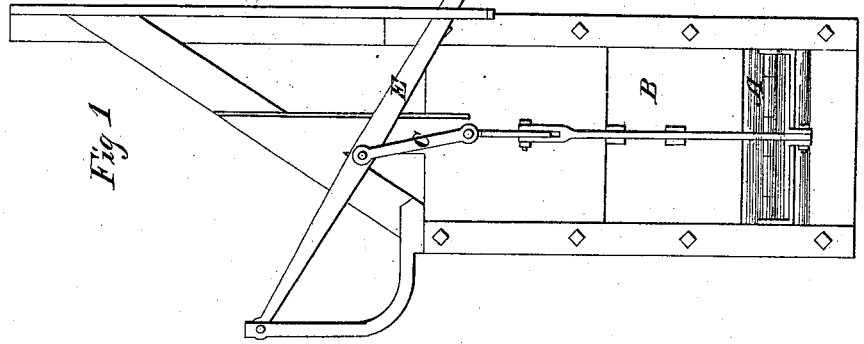

Figure 1 is a side elevation with valves closed; Fig. 2, opening of the valves; Fig. 3, connecting rods for opening valves; Fig. 4, sectional views of the rods; Fig. 5, lever for raising the valve.

A is a flange valve.
B is a slide valve.
C is the connecting rods.
D D are sectional views of the rods.
E is a lever.

My valve is so simple that any mechanic could make it and it is not liable to get out of order. It is to be made out of cast iron.

The difficulties attending the raising valves owing to the pressure of water upon them is to a considerable degree obviated as my valve is so arranged that the water helps to raise the valve thereby obviating the difficulties and curtailing the labor of raising valves.

The flange valve A is so combined with the connecting rods C D that by applying the lever E to the connecting rods C D the flange valve A is made to open. This flange valve A is the important feature of my invention it being so constructed and hinged on the slide valve B that upon opening it it presents a bevel surface (see Fig. 2) upon which the water acts upon the wedge principle, and thus assists the person in opening the slide valve B after the flange valve A is opened. The flange valve A requires but little power to open it as the valve is intended to be small compared with the valve B the pressure of water is lessened and this being the difficult point in all valves the first purchase with the lever E requiring much more power than after the valve is raised to a certain height. After the flange valve A is opened it presents a beveled surface to the water passing under it thus forming a pressure of water upon its beveled surface and thereby aiding the person operating the lever E, the valves A, B and connecting rods C, D in raising them much easier than in the usual modes of raising valves as the whole of the pressure of the water must be lifted at a time besides in the opening of two valves the orifice is larger for the water to pass through.

In the closing of the valves A and B another advantage is gained by the movable flange valve A being made to move first by the lever E and connecting rods C D it presents a hollow surface and thus in its half revolving movement of the flange valve A we have the double advantage of the pressure of the water upon its beveled and concave surface and thereby aiding the person operating the valves in raising and closing the valves.

What I claim as my invention and desire to secure by Letters Patent is—

The combination of the flange valve A and slide valve B when said flange valve A is hinged to the lower end of the valve B and made to operate in the manner and for the purposes within described.

W. BUTLER.

In the presence of—
GEORGE P. WILCOX,
SANDY CASLER.